United States Patent
Zhu et al.

(10) Patent No.: US 8,718,025 B2
(45) Date of Patent: May 6, 2014

(54) METHOD AND DEVICE FOR TRANSMITTING DOWNLINK INFORMATION IN MULTI-CARRIER AGGREGATION SYSTEM

(75) Inventors: Yajun Zhu, Beijing (CN); Xueming Pan, Beijing (CN); Rui Zhao, Beijing (CN); Guojun Xiao, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 70 days.

(21) Appl. No.: 13/389,732

(22) PCT Filed: Aug. 10, 2010

(86) PCT No.: PCT/CN2010/075837
§ 371 (c)(1),
(2), (4) Date: Feb. 9, 2012

(87) PCT Pub. No.: WO2011/018024
PCT Pub. Date: Feb. 17, 2011

(65) Prior Publication Data
US 2012/0140746 A1 Jun. 7, 2012

(30) Foreign Application Priority Data
Aug. 10, 2009 (CN) .......................... 2009 1 0090846

(51) Int. Cl.
*H04W 74/04* (2009.01)
*H04W 72/12* (2009.01)
(52) U.S. Cl.
CPC ................................ *H04W 72/1289* (2013.01)
USPC ........................................ 370/336; 370/329
(58) Field of Classification Search
None
See application file for complete search history.

(56) References Cited

U.S. PATENT DOCUMENTS

| | | | | |
|---|---|---|---|---|
| 2009/0296624 A1* | 12/2009 | Ryu et al. | ........................ | 370/312 |
| 2010/0232373 A1* | 9/2010 | Nory et al. | ..................... | 370/329 |
| 2010/0254329 A1* | 10/2010 | Pan et al. | ....................... | 370/329 |
| 2011/0064042 A1* | 3/2011 | Kim et al. | ....................... | 370/329 |

(Continued)

FOREIGN PATENT DOCUMENTS

| | | |
|---|---|---|
| CN | 101404526 A | 4/2009 |
| CN | 101478808 A | 4/2009 |
| CN | 101483828 A | 4/2009 |

OTHER PUBLICATIONS

CATT (DL Control Channel Scheme for LTE-A, R1-091994), published on May 8, 2009.*

(Continued)

*Primary Examiner* — Hassan Kizou
*Assistant Examiner* — Tejis Daya
(74) *Attorney, Agent, or Firm* — Foley & Lardner LLP; James F. Ewing (57) ABSTRACT

The present invention discloses a method and device for transmitting downlink information in a multi-carrier aggregation system. The Method includes: a base station side sends a downlink subframe to a terminal side, wherein, the physical downlink control channel (PDCCH) in the downlink subframe is used for bearing more than one piece of downlink control indicating information and the carrier scheduling indicating information corresponding to each downlink control indicating information. It solves the problem in the prior art of indefinite identification at the terminal side because the length of DCI may be same due to the difference of the bandwidths of carriers in the carrier aggregation system.

12 Claims, 4 Drawing Sheets

(56) References Cited

U.S. PATENT DOCUMENTS

2011/0228724 A1* 9/2011 Gaal et al. .................. 370/328
2012/0044921 A1* 2/2012 Chung et al. ............... 370/338
2012/0327891 A1* 12/2012 Nam et al. .................. 370/329

OTHER PUBLICATIONS

InterDigital Communciations, LLC (Simulation results for implicit and explicit Carrier Indication, R1-093069), published on Aug. 28, 2009.*
ZTE (Considerations on Carrier Indicator, R1-093207), Aug. 29, 2009.*
CMCC (Related issues on PDDCH carrier indication, R1-093268), Aug. 28, 2009.*
Research in Motion UK Limited (Carrier Indication for Carrier Aggregation, R1-093296), published on Aug. 28, 2009.*
Pantech & Curitel (Considerations on Carrier Indicator for Carrier, R1-093452), published on Aug. 28, 2009.*
CATT, Potevio (Benefits of Carrier Indicator on Multi-channel ACK/NACK transmission, R1-093537), published on Aug. 28, 2009.*
Panasonic (Component carrier indication scheme for carrier aggregation, R1-093465), published on Aug. 28, 2009.*
Ericsson (Mapping of CIF to component carriers), published on Jan. 22, 2010.*
International Search Report for PCT/CN2010/075837 dated Nov. 18, 2010.

* cited by examiner

METHOD AND DEVICE FOR TRANSMITTING DOWNLINK INFORMATION IN MULTI-CARRIER AGGREGATION SYSTEM

This application is a US National Stage of International Application No. PCT/CN2010/075837, filed 10 Aug. 2010, designating the United States, and claiming the benefit of Chinese Patent Application No. 200910090846.8, filed with the Chinese Patent Office on Aug. 10, 2009 and entitled "Method and device for transmitting downlink information in multi-carrier aggregation system", both of which are hereby incorporated by reference in their entirety.

FIELD

Background

There is only one carrier in a cell of a Long Term Evolution (LTE) system and earlier radio communication systems, and there is a maximum bandwidth of 20 MHz in the LTE system.

There are significantly improved peak rates in a Long Term Evolution-Advanced (LTE-A) system as compared with the LTE system, and the bandwidth of 20 MHz has failed to satisfy such a demand. Therefore the bandwidth has to be extended for the LTE-A system so that there are a plurality of carriers in a cell of LTE-A and Carrier Aggregation (CA) has been introduced, that is, a plurality of consecutive and inconsecutive carriers are aggregated together in the same cell to serve a user equipment concurrently as needed to thereby provide a desired rate, and these carriers are generally referred to as a component carrier or simply a carrier.

Figure 1:
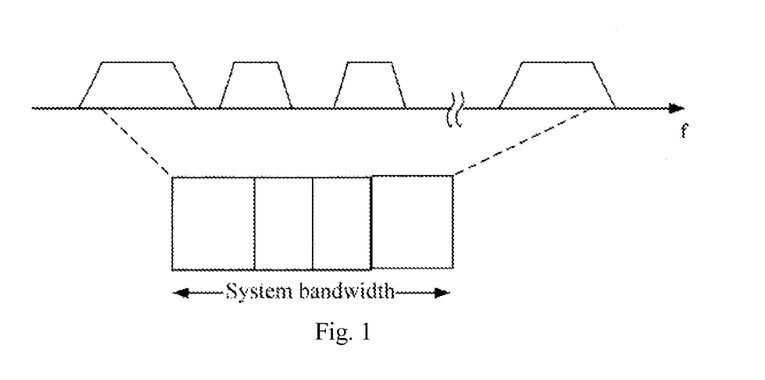
FIG. 1 is a schematic diagram of aggregated inconsecutive carriers.

In the LTE system, downlink control signaling and uplink scheduling signaling is carried in Downlink Control Information (DCI), and scheduling information over each carrier is indicated in Physical Downlink Control Channel (PDCCH) information over the carrier. Different DCI formats are distinguished by their lengths. In the LTE-A system, aggregation of different bandwidths is supported, for example, aggregation of consecutive carriers and aggregation of inconsecutive carriers is supported, the latter of which is illustrated in FIG. 1, and resources of a plurality of component carriers are linked together for use to achieve a higher data speed ratio. Since the respective component carriers in the LTE-A system may have different bandwidths, DCI information for the plurality of different bandwidths may be present for a user at a time. How to demodulate accurately the DCI information for the different component carriers is an issue to be focused upon.

Figure 2:
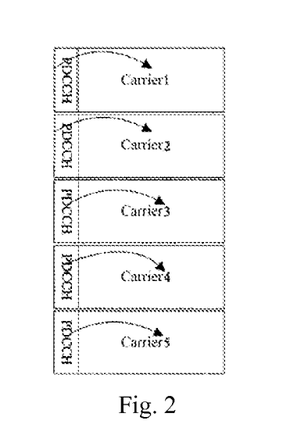
FIG. 2 is a schematic diagram of the first PDCCH indication solution.

Generally, there are two solutions to an existing PDCCH indication method in a discussion about a PDCCH of the LTE-A system:

In a first solution, a base station transmits a PDCCH separately over each component carrier, and only a physical resource of the component carrier can be scheduled on this PDCCH, as illustrated in FIG. 2. This solution is advantageous due to the features of good compatibility with an R8 system, no need of carrier indicator information, a low PDCCH blocking probability and power balance.

Figure 3:
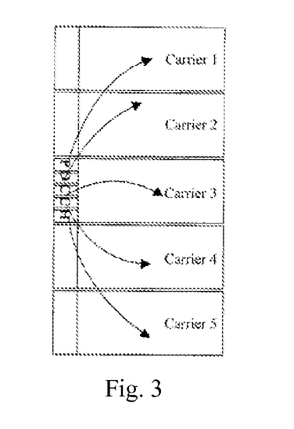
FIG. 3 is a schematic diagram of the second PDCCH indication solution.

In a second solution, it is possible to schedule through a plurality of PDCCHs over one of the component carriers the physical resources of the other component carriers, where the resource of one component carrier can be scheduled only on one of the PDCCHs, as illustrated in FIG. 3, and this solution is advantageous primarily due to high scheduling flexibility and possible good interference coordination.

The second solution is currently supported by the majority of enterprises. This solution may influence somewhat the detection of a DCI despite its scheduling flexibility. A significant problem of indefinite detection at a receiver may arise because different transmission modes can be adopted by a user over different carriers and there may be different bandwidths for the aggregated carriers and identical numbers of bits in different DCI formats under the different bandwidths in the LTE-A system.

Reference is made to Table 1, and there are DCI formats with the same number of bits under different bandwidth, which means possible occurrence of indistinction at a receiver.

The following indistinction scenarios may arise from the perspective of the R8 standard:

1) When the number of bits is 31:
There are the format 1A under the bandwidth of 20 M, the format 1B under the bandwidth of 10 M with two antenna ports, the format 1D under the bandwidth of 10 M with two antenna ports, the format 1B under the bandwidth of 5 M with four antenna ports, the format 1D under the bandwidth of 5 M with four antenna ports, and the format 2A under the bandwidth of 1.4 M.

2) When the number of bits is 30:
There are the format 1A under the bandwidth of 15 M and the format 1 under the bandwidth of 5 M.

3) When the number of bits is 29:
There are the format 1A under the bandwidth of 10 M, the format 1B under the bandwidth of 5 M with two antenna ports, the format 1D under the bandwidth of 5 M with two antenna ports, the format 1B under the bandwidth of 3 M with four antenna ports, and the format 1D under the bandwidth of 3 M with four antenna ports.

4) When the number of bits is 27:
There are the format 1A under the bandwidth of 5 M, the format 1B under the bandwidth of 3 M with two antenna ports, the format 1D under the bandwidth of 3 M with two antenna ports, the format 1B under the bandwidth of 1.4 M with four antenna ports, and the format 1D under the bandwidth of 1.4 M with four antenna ports.

5) When the number of bits is 25:
There are the format 1A under the bandwidth of 3 M, the format 1B under the bandwidth of 1.4 M with two antenna ports, and the format 1D under the bandwidth of 1.4 M with two antenna ports.

TABLE 1

|  | 1.4M (6) | 3M (15) | 5M (25) | 10M (50) | 15M (75) | 20M (100) |
|---|---|---|---|---|---|---|
| format 0 | 23 | 25 | 27 | 29 | 30 | 31 |
| format 1 | 22 | 26 | 30 | 34 | 36 | 42 |
| format 1A | 23 | 25 | 27 | 29 | 30 | 31 |
| format 1B | 25/27 | 27/29 | 29/31 | 31/33 | 33/34 | 33/35 |
| format 1C | 8 | 10 | 12 | 13 | 14 | 15 |
| format 1D | 25/27 | 27/29 | 29/31 | 31/33 | 33/34 | 33/35 |
| format 2 | 34/37 | 37/41 | 42/45 | 46/49 | 48/51 | 54/57 |
| format 2A | 31/33 | 34/36 | 39/41 | 43/45 | 45/47 | 51/53 |
| format 3 | 23 | 25 | 27 | 29 | 30 | 31 |
| format 3A | 23 | 25 | 27 | 29 | 30 | 31 |

Figure 4:
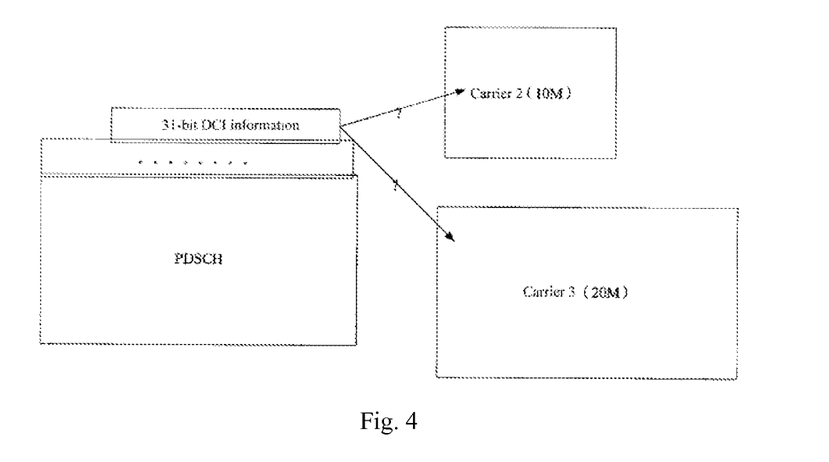
FIG. 4 is a schematic diagram of indefinite identifying of a DCI possibly occurring in the second PDCCH indication solution in the prior art.

Referring to FIG. 4 and following the foregoing analysis, in the case of two aggregated downlink carriers with the bandwidths of 10 M and 20 M, if both of the carriers are in the transmission mode 6, then a user equipment has to perform blind detection of the formats 1A and 1B as in the existing R8 standard, and as can be apparent from the Table, the numbers of bits in both the format 1B under the bandwidth of 10 M (with two antenna ports) and the format 1A under the bandwidth of 20 M are 31. Thus, if the user equipment detects a piece of 31-bit DCI information, then the user equipment can not determine whether it relates to the format 1A under the bandwidth of 20 M or the format 1B under the bandwidth of 10 M, thus failing to demodulate data information accurately.

SUMMARY

The invention provides a method and device for transmitting downlink information in a multi-carrier aggregation system to address the problem in the prior art of indefinite detection at a receiver because the numbers of bits in different DCI formats under different bandwidths may be identical.

A method for transmitting downlink information in a multi-carrier aggregation system according to an embodiment of the invention includes:

a base station side transmitting to a user equipment side a downlink sub-frame including a Physical Downlink Control Channel, PDCCH, on which more than one piece of downlink control indicator information and carrier scheduling indicator information corresponding to each piece of downlink control indicator information is carried.

A device for transmitting downlink information in a multi-carrier aggregation system according to an embodiment of the invention includes:

a configuring unit configured to configure a downlink sub-frame including a Physical Downlink Control Channel, PDCCH, on which more than one piece of downlink control indicator information and carrier scheduling indicator information corresponding to each piece of downlink control indicator information is carried; and a transmitting unit configured to transmit the downlink sub-frame.

A method for acquiring downlink information in a multi-carrier aggregation system according to an embodiment of the invention includes:

a user equipment side acquiring downlink control indicator information corresponding to a carrier occupied for the user equipment side from a Physical Downlink Control Channel, PDCCH, in a downlink sub-frame upon detection of the downlink sub-frame.

A device for acquiring downlink information in a multi-carrier aggregation system according to an embodiment of the invention includes:

a detecting unit configured to detect a downlink sub-frame transmitted from a base station side; and an acquiring unit configured to acquire downlink control indicator information corresponding to a carrier occupied for the device from a Physical Downlink Control Channel, PDCCH, in a downlink sub-frame upon detection of the downlink sub-frame.

In the embodiments of the invention, the base station side transmits to the user equipment side a downlink sub-frame including a downlink control indicator field for transmitting more than one piece of downlink control indicator information and carrier scheduling indicator information corresponding to each piece of downlink control indicator information, thereby addressing effectively the problem of indefinite detection at a receiver because the numbers of bits in different DCI formats under different bandwidths may be identical.

DETAILED DESCRIPTION

In view of the problem in the prior art of indefinite identification at a user equipment side because the DCI lengths of the carriers under different bandwidths in a multi-carrier aggregation system may be identical, in embodiments of the invention, a base station side transmits to a user equipment side a configured downlink sub-frame including a downlink control indicator field, in which more than one piece of DCI information and carrier scheduling indicator information corresponding to each piece of DCI information is transmitted, so that the user equipment side can distinguish the DCI information for different carriers. The downlink control indicator field can be carried on a PDCCH of each downlink sub-frame.

Figure 5:
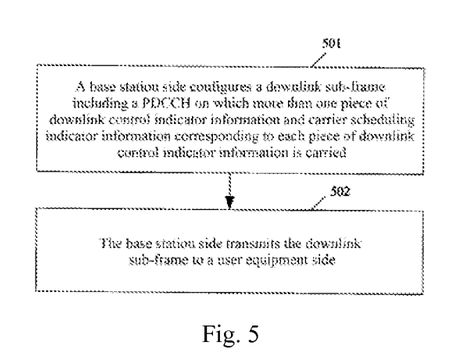
FIG. 5 is a schematic flow chart of a method for transmitting downlink information according to an embodiment of the invention.

Referring to FIG. 5, a method for transmitting downlink information according to an embodiment of the invention includes the following operations:

Operation 501: a base station side configures a downlink sub-frame including a Physical Downlink Control Channel (PDCCH) on which more than one piece of downlink control indicator information and carrier scheduling indicator information corresponding to each piece of downlink control indicator information is carried.

Here the carrier scheduling indicator information corresponding to each piece of downlink control indicator information can be present explicitly or implicitly. The carrier indicator information field is fixed in position relative to the corresponding downlink control indicator information field.

In an example of explicit presence, the carrier indicator information is included in DCI on the PDCCH of each downlink sub-frame, that is, information indicating which carrier is scheduled by a piece of DCI is included in the DCI. For example, more than one downlink control indicator information field and carrier scheduling indicator information field with each downlink control indicator information field corresponding to one carrier indicator information field are included on the PDCCH in the downlink sub-frame, where the downlink control indicator information is transmitted in the downlink control indicator information field, and the carrier scheduling indicator information corresponding to the downlink control indicator information is transmitted in the carrier indicator information field.

Figure 6:
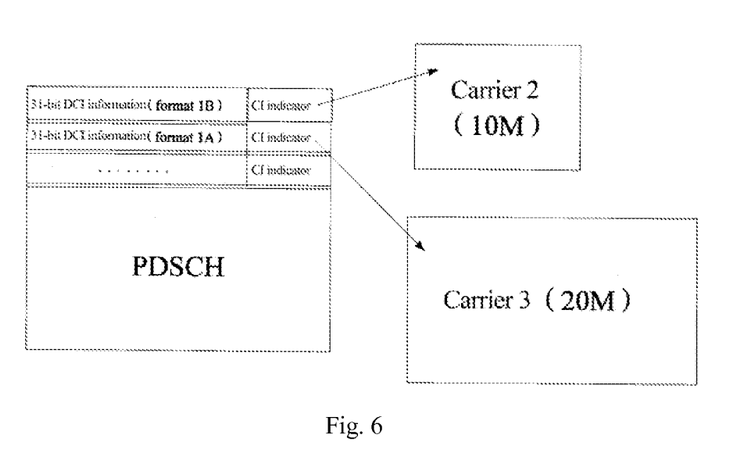
FIG. 6 is a schematic diagram of identifying a DCI in the method according to an embodiment of the invention.

In this solution, a Carrier Indicator (CI) field can be added to an existing DCI information field to indicate which carrier the DCI information is intended for. For example, with regarding to the problem of indefinite DCI format as described above, if the carrier indicator information (e.g., 2-bit CI indicator information, etc.) is added in the front of an existing DCI information field. Referring to FIG. 6, if a user equipment receives a 33 (2 plus 31)-bit DCI, then the user equipment firstly checks the CI indicator information, and if the CI indicator information indicates a carrier with 10 M, then the user equipment can determine the format 1B instead of the format 1A used with the bandwidth of 10 M (because the number of information bits in the format 1A under the bandwidth of 10 M is not 31)

In this solution, the location and the length of the CI indicator field are pre-known to the user side, and the CI field can be detected immediately after the bits of the DCI information are detected, where the CI field can be placed at the beginning or end of the DCI information.

When the carrier scheduling indicator information corresponding to each piece of downlink control indicator information is present implicitly, more than one downlink control indicator information field, in which the downlink control indicator information for a corresponding carrier is transmitted and the corresponding carrier scheduling indicator information is indicated implicitly, is included on the PDCCH in the downlink sub-frame.

In an example of implicit presence, the downlink control indicator information corresponding to each carrier corresponds to a different scrambling sequence, that is, the downlink control indicator information for a different carrier is scrambled with a different scrambling sequence, and the corresponding carrier scheduling indicator information is indicated implicitly in such a way that the carrier scheduling indicator information corresponding to the downlink control indicator information is indicated with the scrambling sequence of the downlink control indicator information. That is, a CRC is scrambled in a CRC masking method in which different scrambling sequences correspond to different pieces of carrier scheduling indicator information, and the user equipment side can acquire the scrambling information and hence the carrier indicator information by checking the CRC information upon reception of downlink information, and this solution can dispense with modification to an original DCI format and offer good backward compatibility.

Furthermore the carrier scheduling indicator information corresponding to each piece of downlink control indicator information can be represented in another implementation, for example, the carrier scheduling indicator information corresponding to each piece of downlink control indicator information can be distinguished by the length of the downlink control indicator information, and further by padding bits if there are DCIs with the same length. In this solution, when the numbers of bits in different DCI formats are identical due to different carrier bandwidths, the base station side adds padding bits of zero to distinguish the indefinite DCI formats, and if the number of bits in a DCI format is identical to that of another DCI format due to the added padding bits, then padding bits will further be added for distinguishing. The number of padding bits of zero can be appointed between the user equipment side and the base station side.

Therefore in this implementation, more than one piece of downlink control indicator information is carried on the PDCCH in the downlink sub-frame, and at this time the carrier scheduling indicator information includes the length of the corresponding downlink control indicator information, and further a zero(s) padded after the corresponding downlink control indicator information to distinguish one carrier from another when the numbers of bits of the downlink control indicator information corresponding to different carriers are identical.

Operation 502: The base station side transmits the downlink sub-frame to a user equipment side.

Since the downlink sub-frame includes more than one piece of downlink control indicator information and the carrier scheduling indicator information corresponding to each piece of downlink control indicator information, the user equipment side can determine a specific DCI format according to a scheduled carrier bandwidth after the downlink sub-frame is transmitted to the user equipment side.

Figure 7:
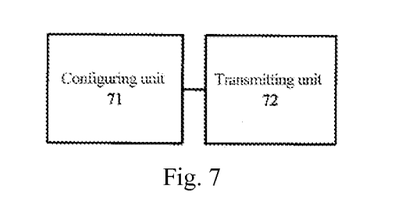
FIG. 7 is a schematic structural diagram of a device for transmitting downlink information according to an embodiment of the invention.

Referring to FIG. 7, a device for transmitting downlink information in a system with multi-carrier aggregation according to an embodiment of the invention includes a configuring unit 71 and a transmitting unit 72, where:

The configuring unit 71 is configured to configure a downlink sub-frame including a Physical Downlink Control Channel (PDCCH) on which more than one piece of downlink control indicator information and carrier scheduling indicator information corresponding to each piece of downlink control indicator information is carried; and The transmitting unit 72 is configured to transmit the downlink sub-frame.

More than one piece of downlink control indicator information field and carrier scheduling indicator information field with each downlink control indicator information field corresponding to one carrier indicator information field can be included on the PDCCH in the downlink sub-frame, where the downlink control indicator information is transmitted in the downlink control indicator information field, and the carrier scheduling indicator information corresponding to the downlink control indicator information is transmitted in the carrier scheduling indicator information field. The carrier indicator information field is relatively fixed in position relative to the corresponding downlink control indicator information field. For example, the carrier indicator information field is located before, after or spaced by a specific number of bits from the corresponding downlink control indicator information field.

More than one downlink control indicator information field, in which the downlink control indicator information for a corresponding carrier is transmitted and the corresponding carrier scheduling indicator information is indicated implicitly, can be included on the PDCCH in the downlink sub-frame. If the downlink control indicator information corresponding to each carrier corresponds to a different scrambling sequence, then the scrambling sequence corresponding to each piece of downlink control indicator information can be taken as the carrier scheduling indicator information.

More than one downlink control indicator information field, in which the downlink control indicator information for a corresponding carrier is transmitted, can be included on the PDCCH in the downlink sub-frame, and the carrier scheduling indicator information includes the length of the corresponding downlink control indicator information, and further a bit(s) padded after the corresponding downlink control indicator information to distinguish one carrier from another when the numbers of bits of the downlink control indicator information corresponding to different carriers are identical. A zero(s) is padded after the corresponding downlink control indicator information to distinguish one carrier from another.

Figure 8:
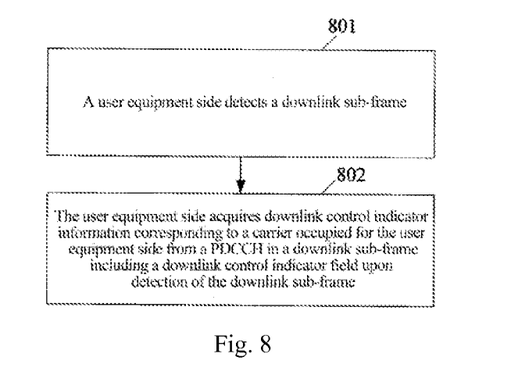
FIG. 8 is a schematic flow chart of a method for acquiring downlink information according to an embodiment of the invention.

Referring to FIG. 8, a method for acquiring downlink information according to an embodiment of the invention includes the following operations:

Operation 801: a user equipment side detects a downlink sub-frame.

Operation 802: The user equipment side acquires downlink control indicator information corresponding to a carrier occupied for the user equipment side from a Physical Downlink Control Channel (PDCCH) in a downlink sub-frame including a downlink control indicator field upon detection of the downlink sub-frame.

The operation 802 can be performed in an implementation varying with a different scenario in which the downlink control indicator information and the carrier scheduling indicator information is carried in the downlink control indicator field, and for example:

If more than one downlink control indicator information field and carrier scheduling indicator information field with each downlink control indicator information field corresponding to one carrier indicator information field are included on the PDCCH in the downlink sub-frame, where the downlink control indicator information is transmitted in the downlink control indicator information field, and the carrier indicator information corresponding to the downlink control indicator information is transmitted in the carrier scheduling indicator information field, then the downlink control indicator information corresponding to the carrier occupied for the user equipment side can be acquired from the downlink control indicator information field as follows: the user equipment side acquires the carrier indicator information from the carrier indicator information field and the downlink control indicator information corresponding to each piece of carrier indicator information from the corresponding downlink control indicator information field, and acquires the downlink control indicator information corresponding to the carrier occupied for the user equipment side according to bandwidth information for the occupied carrier.

If more than one downlink control indicator information field, in which the downlink control indicator information for a corresponding carrier is transmitted and the corresponding carrier scheduling indicator information is indicated implicitly, is included on the PDCCH in the downlink sub-frame, and if the corresponding carrier scheduling indicator information is implicitly indicated by a scrambling sequence of the downlink control indicator information for the carrier, then the downlink control indicator information corresponding to the carrier occupied for the user equipment side can be acquired from the downlink control indicator information field as follows: the user equipment side descrambles the detected downlink control indicator information with scrambling sequences corresponding to respective carriers occupied for the user equipment side so that the downlink control indicator information belongs to a carrier corresponding to a scrambling sequence with successful scrambling if descrambling succeeds.

If more than one downlink control indicator information field, in which the downlink control indicator information for a corresponding carrier is transmitted, is included on the PDCCH in the downlink sub-frame, and the carrier scheduling indicator information includes the length of the corresponding downlink control indicator information, and further a zero(s) padded after the corresponding downlink control indicator information to distinguish one carrier from another when the numbers of bits of the downlink control indicator information corresponding to different carriers are identical, then the downlink control indicator information corresponding to the carrier occupied for the user equipment side can be acquired from the downlink control indicator information field as follows: the user equipment side distinguishes by the length of each piece of downlink control indicator information and acquires the downlink control indicator information corresponding to the carrier occupied for the user equipment side.

Figure 9:
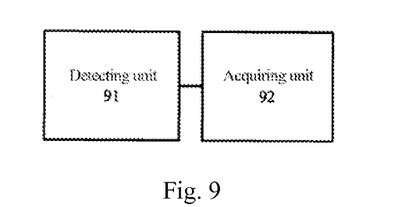
FIG. 9 is a schematic structural diagram of a device for acquiring downlink information according to an embodiment of the invention.

Referring to FIG. 9 and in correspondence to the method illustrated in FIG. 8, a device for acquiring downlink information according to an embodiment of the invention includes a detecting unit 91 and an acquiring unit 92, where:

The detecting unit 91 is configured to detect a downlink sub-frame transmitted from a base station side; and The acquiring unit 92 is configured to acquire downlink control indicator information corresponding to a carrier occupied for the device from a Physical Downlink Control Channel (PDCCH) in a downlink sub-frame upon detection of the downlink sub-frame.

If more than one downlink control indicator information field and carrier scheduling indicator information field with each downlink control indicator information field corresponding to one carrier scheduling indicator information field are included on the PDCCH in the downlink sub-frame, where the downlink control indicator information is transmitted in the downlink control indicator information field, and carrier scheduling indicator information corresponding to the downlink control indicator information is transmitted in the carrier indicator information field, then the acquiring unit 82 is configured to acquire the carrier indicator information from the carrier indicator information field and the downlink control indicator information corresponding to each piece of carrier indicator information from the corresponding downlink control indicator information field, and to acquire the downlink control indicator information corresponding to the carrier occupied for the user equipment side according to bandwidth information for the carrier occupied for the user equipment side.

If more than one downlink control indicator information field, in which the downlink control indicator information for a corresponding carrier is transmitted and corresponding carrier scheduling indicator information is indicated implicitly, is included on the PDCCH in the downlink sub-frame, and if the corresponding carrier scheduling indicator information is implicitly indicated by a scrambling sequence of the downlink control indicator information for the carrier, then the acquiring unit 92 is configured to descramble the detected downlink control indicator information with scrambling sequences corresponding to respective carriers occupied for the user equipment side so that the downlink control indicator information belongs to a carrier corresponding to a scrambling sequence with successful scrambling if descrambling succeeds.

If more than one downlink control indicator information field, in which the downlink control indicator information for a corresponding carrier is transmitted, is included on the PDCCH in the downlink sub-frame, and the carrier scheduling indicator information includes the length of the corresponding downlink control indicator information, and further a zero(s) padded after the corresponding downlink control indicator information to distinguish one carrier from another when the numbers of bits of the downlink control indicator information corresponding to different carriers are identical, then the acquiring unit 92 is configured to distinguish by the length of each piece of downlink control indicator information and acquire the downlink control indicator information corresponding to the carrier occupied for the device.

In the embodiments of the invention, the base station side configures a PDCCH of a downlink sub-frame and processes DCI by including carrier scheduling indicator information therein. Here the carrier indicator information can be indicated explicitly by adding a CI bit field to DCI information or indicated implicitly. In the case of being indicated explicitly, the location of the CI information field in the DCI is pre-known, and the CI information field can be placed at the beginning or end of the DCI information.

In the case of being indicated explicitly, the base station side adds carrier indicator bits to each DCI. The user equipment side firstly locates a carrier indicator information field at a fixed location and parses it to determine a specific carrier indicated by DCI information in a DCI field in a downlink sub-frame upon reception of the DCI field. Also the user equipment knows bandwidth conditions for respective carriers occupied for the user equipment and can know accurately both which carrier is scheduled by the DCI and a specific format according to carrier indicator information and bandwidth information in combination.

In the case of indicated implicitly, DCI information of the user equipment side is transmitted on the PDCCH after a CRC check is added thereto in the R8 system. In order to acquire carrier indicator information, each carrier may correspond to one sequence. The base station side scrambles the CRC added to the DCI information with a sequence corresponding to a carrier scheduled by the DCI and then transmits the DCI information on the PDCCH. The user equipment side verifies the CRC by descrambling the CRC respectively with different sequences corresponding to its own respective carriers, and the DCI indicates a carrier corresponding to a sequence with which the CRC can be descrambled successfully. Thus the information on the carrier scheduled by the DCI can be acquired implicitly, and then the user can know accurately both which carrier is scheduled by the DCI and a specific format according to carrier indicator information and bandwidth information in combination.

In the embodiments of the invention, the situation with an indefinite DCI format can also be addressed by padding bits. In view of the situation in which the lengths of different DCI formats are identical due to different bandwidths for aggregated carriers, padding bits are added thereto to change the length thereof, so that the situation of indistinction can be prevented at a receiver.

The embodiments of the invention can address effectively the situation of indefinite DCI format to thereby enable accurate detection of a DCI in the case of different bandwidths for aggregated carriers.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method for transmitting downlink information in a multi-carrier aggregation system, comprising:
a base station side transmitting to a user equipment side a downlink sub-frame comprising a Physical Downlink Control Channel, PDCCH, on which downlink control indicator information and carrier scheduling indicator information corresponding to each piece of downlink control indicator information is carried;
wherein a downlink control indicator information field and a carrier scheduling indicator information field with each downlink control indicator information field corresponding to one carrier scheduling indicator information field are comprised on the PDCCH in the downlink sub-frame, and
wherein the downlink control indicator information is transmitted in the downlink control indicator information field, the carrier scheduling indicator information corresponding to the downlink control indicator information is transmitted in the carrier scheduling indicator information field, and the carrier scheduling indicator information field is fixed in position relative to the corresponding downlink control indicator information field.

2. The method of claim 1, wherein the carrier scheduling indicator information field is located at the beginning or end of, or spaced by a specific number of bits from the corresponding downlink control indicator information field.

3. The method of claim 2, wherein the location and length of the carrier scheduling indicator information field are pre-known to the user equipment side so that the user equipment side can detect the carrier scheduling indicator information field upon detecting the corresponding downlink control indicator information field.

4. A system for transmitting downlink information in a multi-carrier aggregation system, comprising a base station configured:
to configure a downlink sub-frame comprising a Physical Downlink Control Channel, PDCCH, on which downlink control indicator information and carrier scheduling indicator information corresponding to each piece of downlink control indicator information is carried; and
wherein a downlink control indicator information field and a carrier scheduling indicator information field with each downlink control indicator information field corresponding to one carrier scheduling indicator information field are comprised on the PDCCH in the downlink sub-frame, and
wherein the downlink control indicator information is transmitted in the downlink control indicator information field, the carrier scheduling indicator information corresponding to the downlink control indicator information is transmitted in the carrier scheduling indicator information field, and the carrier scheduling indicator information field is fixed in position relative to the corresponding downlink control indicator information field.

5. The system of claim 4, wherein the carrier scheduling indicator information field is located at the beginning or end of, or spaced by a specific number of bits from the corresponding downlink control indicator information field.

6. The system of claim 5, wherein the location and length of the carrier scheduling indicator information field are pre-known to the user equipment side so that the user equipment side can detect the carrier scheduling indicator information field upon detecting the corresponding downlink control indicator information field.

7. A method for acquiring downlink information in a multi-carrier aggregation system, comprising:
a user equipment side acquiring downlink control indicator information corresponding to a carrier occupied for the user equipment side from a Physical Downlink Control Channel, PDCCH, in a downlink sub-frame upon detection of the downlink sub-frame;
wherein a downlink control indicator information field and a carrier scheduling indicator information field with each downlink control indicator information field corresponding to one carrier scheduling indicator information field are comprised on the PDCCH in the downlink sub-frame, and wherein the downlink control indicator information is transmitted in the downlink control indicator information field, and carrier scheduling indicator information corresponding to the downlink control indicator information is transmitted in the carrier scheduling indicator information field, and acquiring downlink control indicator information corresponding to a carrier occupied for the user equipment side comprises:

the user equipment side acquiring the carrier scheduling indicator information from the carrier scheduling indicator information field and the downlink control indicator information corresponding to each piece of carrier scheduling indicator information from the corresponding downlink control indicator information field, and acquiring the downlink control indicator information corresponding to the carrier occupied for the user equipment side according to bandwidth information for the carrier occupied for the user equipment side.

8. The method of claim 7, wherein the carrier scheduling indicator information field is located at the beginning or end of, or spaced by a specific number of bits from the corresponding downlink control indicator information field.

9. The method of claim 8, wherein the location and length of the carrier scheduling indicator information field are pre-known to the user equipment side so that the user equipment side can detect the carrier scheduling indicator information field upon detecting the corresponding downlink control indicator information field.

10. A system for acquiring downlink information in a multi-carrier aggregation system, comprising a user equipment configured:

to detect a downlink sub-frame transmitted from a base station side; and to acquire downlink indicator information corresponding to a carrier occupied for the device from a Physical Downlink Control Channel, PDCCH, in a downlink sub-frame upon detection of the downlink sub-frame;

wherein a downlink control indicator information field and a carrier scheduling indicator information field with each downlink control indicator information field corresponding to one carrier scheduling indicator information field are comprised on the PDCCH in the downlink sub-frame, and wherein the downlink control indicator information is transmitted in the downlink control indicator information field, and carrier scheduling indicator information corresponding to the downlink control indicator information is transmitted in the carrier scheduling indicator information field, and the user equipment is configured to acquire the carrier scheduling indicator information from the carrier scheduling indicator information field and the downlink control indicator information corresponding to each piece of carrier scheduling indicator information from the corresponding downlink control indicator information field, and to acquire the downlink control indicator information corresponding to the carrier occupied for a user equipment side according to bandwidth information for the carrier occupied for the user equipment side.

11. The system of claim 10, wherein the carrier scheduling indicator information field is located at the beginning or end of, or spaced by a specific number of bits from the corresponding downlink control indicator information field.

12. The system of claim 11, wherein the location and length of the carrier scheduling indicator information field are pre-known to the user equipment so that the user equipment can detect the carrier scheduling indicator information field upon detecting the corresponding downlink control indicator information field.

* * * * *